United States Patent
Kuehner et al.

(10) Patent No.: US 12,071,087 B2
(45) Date of Patent: Aug. 27, 2024

(54) GENERATING AN AIR CUSHION THROUGH A PERFORATED SURFACE TO PREVENT TRAVEL DIRECTION-FACING SURFACES FROM COLLECTING DEBRIS

(71) Applicant: TOYOTA RESEARCH INSTITUTE, INC., Los Altos, CA (US)

(72) Inventors: Manuel Ludwig Kuehner, Mountain View, CA (US); Hiroshi Yasuda, San Francisco, CA (US); Guillermo Pita Gil, Redwood City, CA (US); Jaime S. Camhi, Los Gatos, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 17/713,935

(22) Filed: Apr. 5, 2022

(65) Prior Publication Data
US 2023/0311839 A1    Oct. 5, 2023

(51) Int. Cl.
*B60R 19/54* (2006.01)
*B60Q 1/04* (2006.01)

(52) U.S. Cl.
CPC ............ *B60R 19/54* (2013.01); *B60Q 1/0408* (2013.01)

(58) Field of Classification Search
CPC ............................ B60Q 1/0408; B60Q 1/0035
USPC ......... 296/180.1; 359/507, 509; 15/301, 313
See application file for complete search history.

(56) References Cited

U.S. PATENT DOCUMENTS

| | | | |
|---|---|---|---|
| 5,546,630 A * | 8/1996 | Long ...................... | B60S 1/603 15/313 |
| 6,944,908 B2 * | 9/2005 | Hoetzer ................ | B60S 1/0822 134/102.1 |
| 8,167,442 B1 * | 5/2012 | Hidden ................. | B60R 1/0602 359/507 |
| 9,707,896 B2 * | 7/2017 | Boegel ..................... | B05B 7/00 |
| 10,295,143 B2 | 5/2019 | Inoue | |
| 10,359,303 B1 | 7/2019 | Krishnan | |
| 10,744,979 B2 * | 8/2020 | Schmidt .................... | B60S 1/52 |
| 10,928,225 B1 | 2/2021 | Krishnan | |
| 11,608,032 B2 * | 3/2023 | Yu ......................... | H04N 23/51 |
| 2006/0012208 A1 | 1/2006 | Brash | |
| 2006/0193049 A1 * | 8/2006 | Chen .................... | B60R 1/0602 359/507 |
| 2012/0162428 A1 * | 6/2012 | Wee ......................... | B60S 1/56 348/148 |

(Continued)

FOREIGN PATENT DOCUMENTS

CN       112197881       1/2021
KR     2006025998 A  *  3/2006

*Primary Examiner* — Amy R Weisberg
*Assistant Examiner* — Veronica M Shull
(74) *Attorney, Agent, or Firm* — SHEPPARD, MULLIN, RICHTER & HAMPTON LLP; Daniel N. Yannuzzi

(57) ABSTRACT

Systems and methods are provided for preventing headwind debris from collecting on travel direction-facing housing surfaces of a vehicle by creating protective "air cushions" in front of the travel direction-facing housing surfaces. These air cushions may divert headwind air away from the travel direction-facing housing surfaces, ensuring that headwind debris does not collect on them. Examples may create these protective air cushions by propelling high pressure air through perforated surfaces in a contrary direction to headwind.

20 Claims, 3 Drawing Sheets

(56) References Cited

U.S. PATENT DOCUMENTS

2020/0229530 A1   7/2020   Feher

* cited by examiner

GENERATING AN AIR CUSHION THROUGH A PERFORATED SURFACE TO PREVENT TRAVEL DIRECTION-FACING SURFACES FROM COLLECTING DEBRIS

TECHNICAL FIELD

The present disclosure relates generally to automotive systems and technologies, and more particularly, some examples relate to generating an air cushion through a perforated surface to prevent travel direction-facing vehicle surfaces from collecting dirt or insects.

DESCRIPTION OF RELATED ART

Headwind air may refer to airflow which travels in a contrary direction to vehicle motion. When a vehicle is traveling, headwind air may buffet the travel direction-facing surfaces of the vehicle.

BRIEF SUMMARY OF THE DISCLOSURE

According to various examples of the disclosed technology, a vehicle is provided. The vehicle may comprise: (a) a housing for protecting a travel direction-facing device, the housing comprising a travel direction-facing perforated surface, the travel direction-facing perforated surface defining a cavity within the housing behind the travel direction-facing perforated surface; (b) the travel direction-facing device disposed within the cavity; and (c) a tube fluidly connected to the cavity that emits high pressure air into the cavity, wherein the high pressure air is propelled out of the cavity in a contrary direction to headwind air through holes in the travel direction-facing perforated surface, the propelled air forming an air cushion in front of the travel direction-facing perforated surface that diverts headwind air away from the travel direction-facing perforated surface. In certain examples, the vehicle may further comprise a barrier disposed within the cavity that protects the travel direction-facing device from the high pressure air.

In various examples, another vehicle is provided. The vehicle may comprise: (a) a housing for protecting a travel direction-facing device, the housing comprising a travel direction-facing perforated surface, the travel direction-facing perforated surface defining a cavity within the housing behind the travel direction-facing perforated surface; (b) the travel direction-facing device disposed within the cavity; and (c) a tube fluidly connected to the cavity that intakes headwind air through a first opening of the tube and emits, into the cavity through a second opening of the tube, the headwind air at a higher pressure than taken in; wherein (i) the higher pressure air emitted through the second opening of the tube is propelled out of the cavity in a contrary direction to headwind air through holes in the travel direction-facing perforated surface; and (ii) the propelled air forms an air cushion in front of the travel direction-facing perforated surface that diverts headwind air away from the travel direction-facing perforated surface. In some examples, the first opening of the tube is wider than the second opening of the tube, and the tube tapers in diameter from the its wider first opening to its narrower second opening.

In other examples, another vehicle is provided. The vehicle may comprise:

(a) a housing for protecting a travel direction-facing device, the housing comprising a travel direction-facing perforated surface, the travel direction-facing perforated surface defining a cavity within the housing behind the travel direction-facing perforated surface; (b) the travel direction-facing device disposed within the cavity; (c) an air compressor that directs high pressure air through a tube; and (d) the tube that emits the high pressure air into the cavity; wherein: (i) the high pressure air emitted by the tube is propelled out of the cavity in a contrary direction to headwind air through holes in the travel direction-facing perforated surface; and (ii) the propelled air forms an air cushion in front of the travel direction-facing perforated surface that diverts headwind air away from the travel direction-facing perforated surface. In some examples, the air compressor comprises at least one fan that compresses lower pressure air into the high pressure air.

Other features and aspects of the disclosed technology will become apparent from the following detailed description, taken in conjunction with the accompanying drawings, which illustrate, by way of example, the features in accordance with examples of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
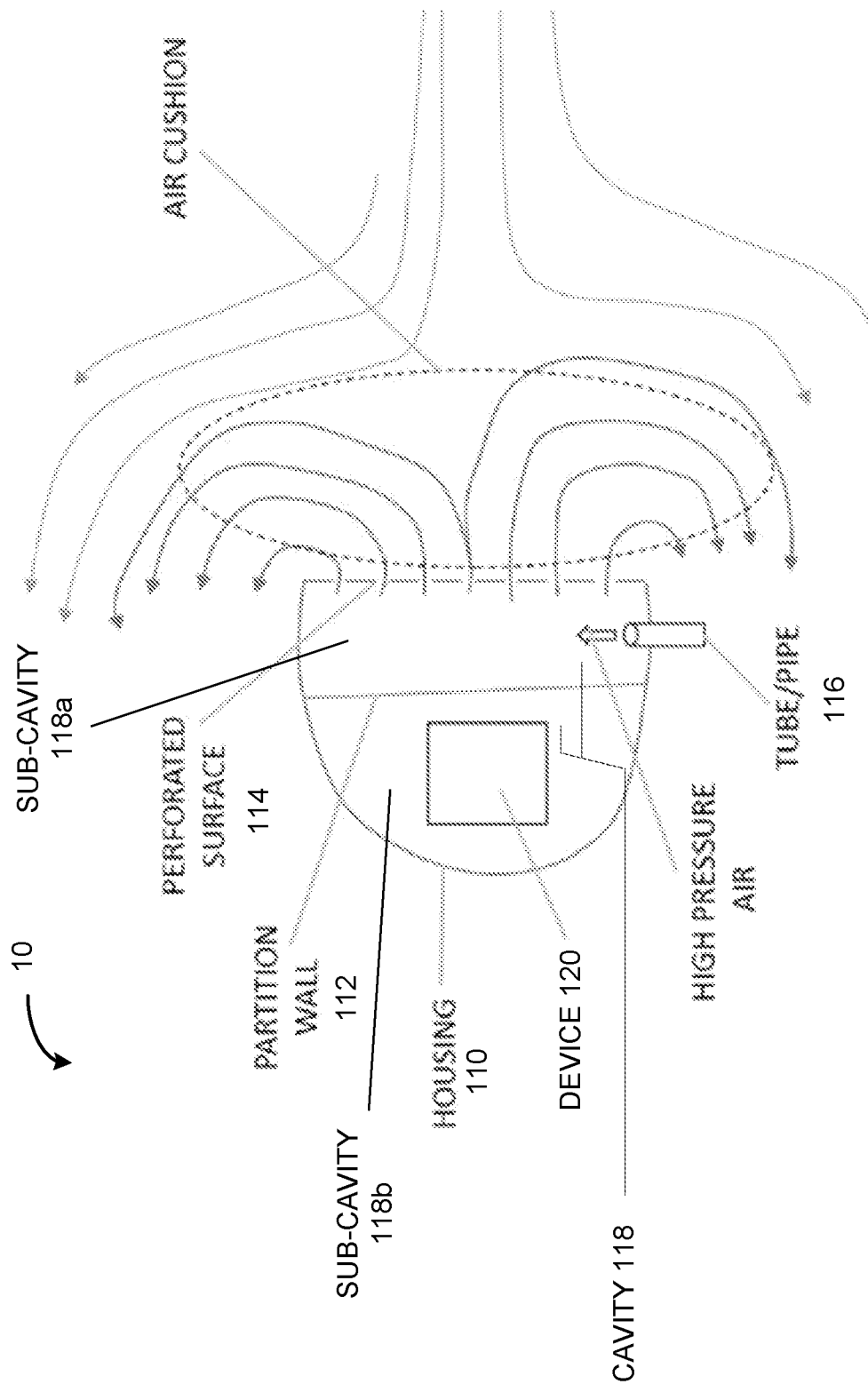
FIG. 1 is an example diagram depicting a system for creating a protective air cushion in front of a travel direction-facing housing of a vehicle, in accordance with examples of the systems and methods described herein.

The figures are not exhaustive and do not limit the present disclosure to the precise form disclosed.

DETAILED DESCRIPTION

As described above, headwind air may refer to airflow which travels in a contrary direction to vehicle motion. When a vehicle is traveling, headwind air may buffet the travel direction-facing surfaces of the vehicle. Accordingly, travel direction-facing external surfaces of a vehicle such as headlight housings and protective housings for travel direction-facing optical sensors often collect debris (e.g., dirt, insects, water, etc.) carried by headwind air (i.e., headwind debris). Dirty housing surfaces may occlude travel direction-facing lights and optical sensors of the vehicle, negatively affecting their operation.

Some existing technologies address this "dirty housing" problem by including water spray and wiper systems to clean debris away from the travel direction-facing housings. These technologies require the addition of moving mechanical components and electronic components which can break down, and add installation and maintenance costs. These technologies also fail to prevent headwind debris from collecting on travel direction-facing housing surfaces in the first place.

Examples of the presently disclosed technology prevent headwind debris from collecting on travel direction-facing housing surfaces of a vehicle by creating protective "air cushions" in front of the travel direction-facing housing surfaces (i.e., in front of the travel direction-facing housing surfaces relative to the direction of vehicle travel). These air cushions may divert headwind air away from the travel direction-facing housing surfaces, ensuring that headwind debris does not collect on them. Examples may create these protective air cushions utilizing simple designs that utilize minimal components.

Examples of the presently disclosed technology include a housing for protecting a travel direction-facing device (e.g., a travel direction-facing light or optical sensor). The housing comprises a travel direction-facing perforated surface that defines a cavity within the housing, behind the travel direction-facing perforated surface (the travel direction-facing device may be disposed within this cavity). Examples also include a tube fluidly connected to the cavity which emits high pressure air into the cavity. Based on fluid dynamical principles, the high pressure air introduced into the cavity is propelled out of the cavity through holes in the travel direction-facing perforated surface. This propelled air (which flows in a contrary direction to headwind air) forms an air cushion in front of the travel direction-facing perforated surface that diverts headwind air away from the housing. In this way, examples of the presently disclosed technology may prevent headwind debris from collecting on travel direction-facing housing surfaces.

Various examples may create the aforementioned air cushions without relying on moving mechanical parts and/or electronic components. In these "passive" systems, a first opening of the tube may be located at, e.g., the front of the vehicle where it intakes headwind air when the vehicle is traveling forward. By tapering the diameter of the tube, examples may pressurize the taken in headwind air. In other words, a second opening of the tube which emits pressurized headwind air into the cavity may have a smaller diameter than the first opening of the tube. Such a tube construction may introduce high pressure air into the cavity without relying on mechanical parts and/or electronic components.

As described above, examples of the presently disclosed technology strive to prevent travel direction-facing devices (e.g., lights or optical sensors) from becoming occluded. Accordingly, in various examples the travel direction-facing perforated surface may be transparent or partially transparent. Additionally, certain examples may include a protective barrier within the housing cavity which separates the travel direction-facing device from the high-pressure air introduced into the cavity by the tube. This protective barrier may also be transparent or partially transparent.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well (e.g., electric vehicles, hybrid vehicles, gasoline and diesel powered vehicles, etc.).

FIG. 1 is an example diagram depicting a system for creating a protective air cushion in front of a travel direction-facing housing of a vehicle, in accordance with examples of the systems and methods described herein.

In particular, FIG. 1 depicts housing 110 which may be incorporated into a travel direction-facing portion of vehicle 10 (e.g., the front of the vehicle).

Housing 110 comprises a perforated surface 114. As described above, perforated surface 114 may comprise a transparent or partially transparent material so as not to occlude travel direction-facing device 120.

As depicted, perforated surface 114 defines cavity 118 within housing 110, cavity 118 being behind perforated surface 114. Travel direction-facing device 120 may be disposed within cavity 118. Travel direction-facing device 120 may be various types of travel direction-facing devices such as a travel direction-facing light (e.g., a headlight) or a travel direction-facing optical sensor (e.g., a camera, a LiDar sensor, a radar sensor, etc.).

In various examples, housing 110 may comprise a protective barrier 112. Protective barrier 112 may function to protect travel direction-facing device 120 from high pressure air introduced into cavity 118 by tube 116 (to be described in greater detail below). In certain examples protective barrier 112 may comprise a partition wall which creates two sub-cavities: one sub-cavity to the right of protective barrier 112 where high pressure air is introduced (i.e., sub-cavity 118a), and one sub-cavity to the left of protective barrier 112 which houses travel direction-facing device 120 (i.e., sub-cavity 118b). Like perforated surface 114, protective barrier 112 may comprise a transparent or partially transparent material so as not to occlude travel direction-facing device 120.

As depicted, tube 116 is fluidly connected to cavity 118. Tube 116 may be various types of tubes/pipes comprised of various types of materials.

Tube 116 emits high pressure air into cavity 118 (sources for this high pressure air will be discussed in greater detail in conjunction with FIGS. 2 and 3). As examples of the presently disclosed technology appreciate, high pressure air will always move/force its way towards lower pressure. Accordingly, by emitting into cavity 118, air of a higher pressure than air external to cavity 118, examples may ensure that the higher pressure air introduced into cavity 118 is propelled out of cavity 118 through the holes/perforations of perforated surface 114. As depicted in FIG. 1, perforated surface 114 may be constructed so as it to direct the air propelled from cavity 118 in a direction contrary to headwind air.

By propelling high pressure air in a contrary direction to headwind air in front of housing 110, examples may create an air cushion in front of housing 110 which diverts headwind air away from housing 110. Accordingly, any debris carried in the headwind air (i.e., headwind debris) may be diverted away from the travel direction-facing surfaces of housing 110 (i.e., perforated surface 114), ensuring that headwind debris does not collect on them.

Figure 2:
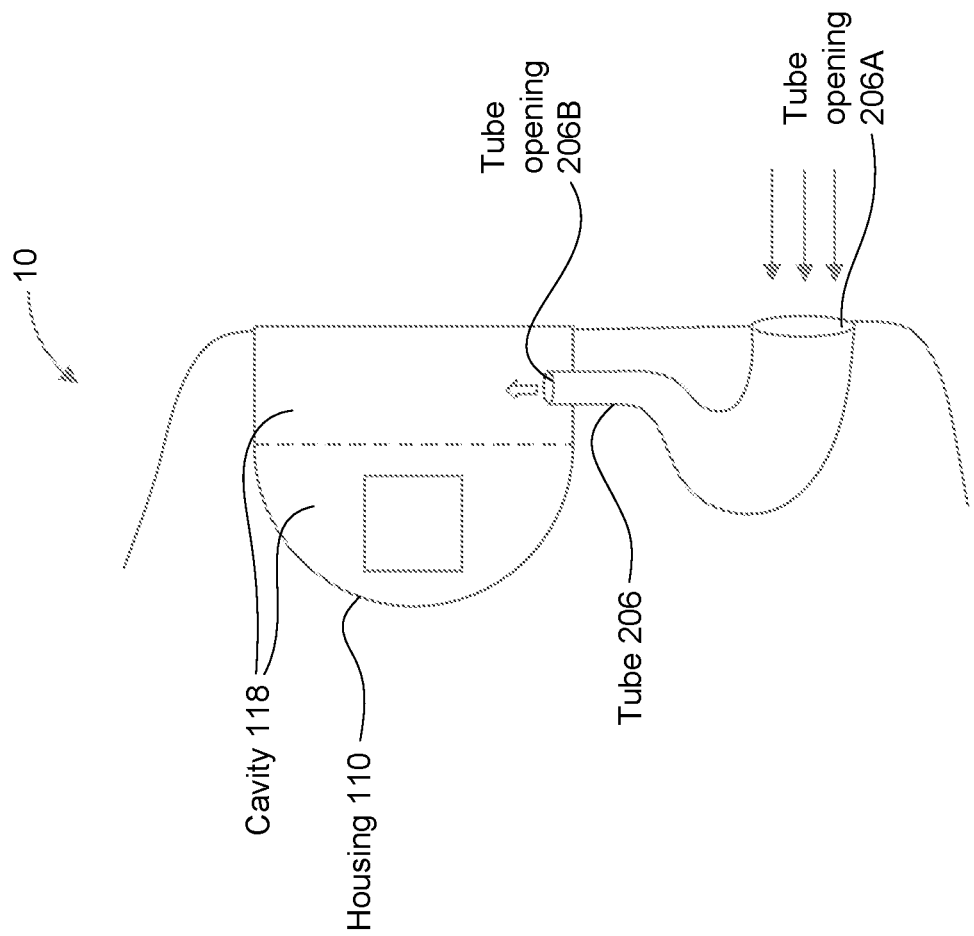
FIG. 2 is another example diagram depicting a system for creating a protective air cushion in front of a travel direction-facing housing of a vehicle, in accordance with examples of the systems and methods described herein.

FIG. 2 is another example diagram depicting a system for creating a protective air cushion in front of a travel direction-facing housing of a vehicle, in accordance with examples of the systems and methods described herein. In particular, FIG. 2 depicts a "passive" system for introducing high pressure air into cavity 118 within housing 110 (as described in conjunction with FIG. 1).

As depicted, tube 206 (which may be a particular example of tube 106 from FIG. 1) comprises a first tube opening (i.e., tube opening 206a) and a second tube opening (i.e., tube opening 206b). Tube opening 206a may be located at, e.g., the front of vehicle 10 so as to intake headwind air when vehicle 10 is traveling forward. Tube opening 206b may be fluidly connected to cavity 118, and may emit the taken in headwind air into cavity 118. In various examples, tube 206 may pressurize the taken in headwind air before emitting it into cavity 118. In particular, tube 206 may be tapered so that tube opening 206a is wider than tube opening 206b. By transmitting the headwind air through a narrowed diameter, tube 206 may pressurize the headwind air, ensuring that it is emitted into cavity 118 at a higher pressure than the air external to cavity 118. As described in conjunction with FIG. 1, the high pressure air emitted into cavity 118 by tube 206 may be propelled through holes in perforated surface 114 to form an air cushion in front of housing 110. This air cushion may divert headwind away from perforated surface 114, thereby preventing headwind debris from collecting on perforated surface 114.

As described above, the "passive" system of FIG. 2 may pressurize the air introduced into cavity 118 without relying on moving mechanical components or electric components. Thus, the examples of FIG. 2 may involve lower installation and maintenance costs than other housing cleaning systems (e.g., wipers).

Figure 3:
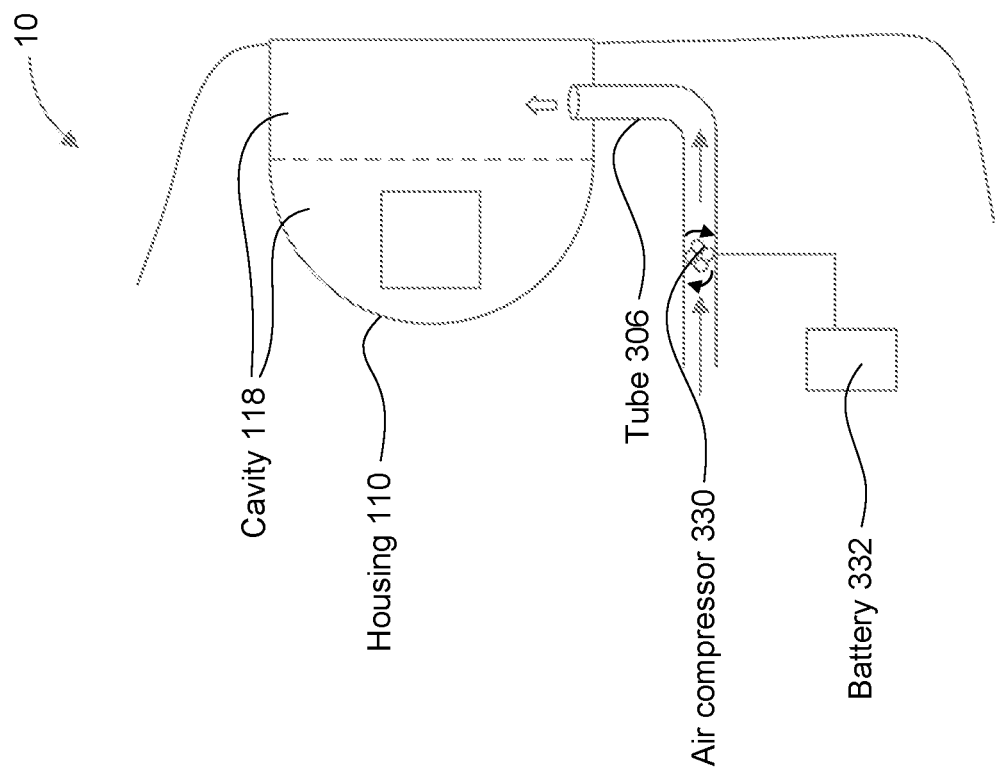
FIG. 3 is another example diagram depicting a system for creating a protective air cushion in front of a travel direction-facing housing of a vehicle, in accordance with examples of the systems and methods described herein.

FIG. 3 is another example diagram depicting a system for creating a protective air cushion in front of a travel direction-facing housing of a vehicle, in accordance with examples of the systems and methods described herein. In particular, FIG. 3 depicts an "active" system for introducing high pressure air into cavity 118 within housing 110 (as described in conjunction with FIG. 1).

As depicted, tube 306 receives high pressure air compressed by air compressor 330 and emits the high pressure air into cavity 118. Air compressor 330 may comprise various types of devices used for compressing/pressurizing air. As examples, air compressor 330 may comprise a fan, a series of fans, a pneumatic air compressor, etc. In various examples, air compressor 330 may be powered by battery 332.

Where air compressor 330 is externally powered, examples may not require headwind to introduce high pressure air into cavity 118. In other words, the examples of FIG. 3 may not require vehicle motion to create air cushions in front of tracel direction-facing housing surfaces. This may be advantageous for keeping these surfaces clean when vehicle 10 is stationary or only traveling slowly.

In various examples, the system described in FIG. 2 may be combined with the system of FIG. 3. In other words, an air compressor may be implemented in between tube opening 206a and tube opening 206b. This air compressor may assist with compressing/pressurizing air taken in by tube opening 206a when, e.g., vehicle 10 is stationary or traveling slowly.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various examples set forth herein are described in terms of exemplary block diagrams, flow charts and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

What is claimed is:

1. A vehicle comprising:
    a housing for protecting a travel direction-facing device, the housing comprising a travel direction-facing perforated surface, the travel direction-facing perforated surface defining a cavity within the housing behind the travel direction-facing perforated surface;
    the travel direction-facing device disposed within the cavity; and
    a tube fluidly connected to the cavity that emits pressurized air into the cavity, wherein the pressurized air is propelled out of the cavity in a contrary direction to headwind air through holes in the travel direction-facing perforated surface, the propelled air forming an air cushion in front of the travel direction-facing perforated surface that diverts headwind air away from the travel direction-facing perforated surface.

2. The vehicle of claim 1, further comprising a barrier disposed within the cavity that protects the travel direction-facing device from the pressurized air.

3. The vehicle of claim 1, wherein the tube:
    intakes headwind air through a first opening of the tube;
    pressurizes the taken in headwind air into the pressurized air; and
    emits the pressurized air into the cavity through a second opening of the tube, wherein the first opening of the tube is wider than the second opening of the tube.

4. The vehicle of claim 1, further comprising an air compressor fluidly connected to the tube that directs the pressurized air through the tube.

5. The vehicle of claim 1, wherein the travel direction-facing device is a travel direction-facing optical sensor.

6. The vehicle of claim 1, wherein the travel direction-facing device is a travel direction-facing light.

7. The vehicle of claim 1, wherein the travel direction-facing perforated surface is at least partially transparent.

8. A vehicle comprising:
a housing for protecting a travel direction-facing device, the housing comprising a travel direction-facing perforated surface, the travel direction-facing perforated surface defining a cavity within the housing behind the travel direction-facing perforated surface;
the travel direction-facing device disposed within the cavity; and
a tube fluidly connected to the cavity that intakes headwind air through a first opening of the tube and emits, into the cavity through a second opening of the tube, the headwind air at a higher pressure than taken in;
wherein:
    the higher pressure air emitted through the second opening of the tube is propelled out of the cavity in a contrary direction to headwind air through holes in the travel direction-facing perforated surface; and
    the propelled air forms an air cushion in front of the travel direction-facing perforated surface that diverts headwind air away from the travel direction-facing perforated surface.

9. The vehicle of claim 8, wherein first opening of the tube is wider than the second opening of the tube, and the tube tapers in diameter from the its wider first opening to its narrower second opening.

10. The vehicle of claim 9, further comprising a barrier disposed within the cavity that protects the travel direction-facing device from the higher pressure air emitted through the second opening of the tube.

11. The vehicle of claim 10, wherein the barrier and the travel direction-facing perforated surface are at least partially transparent.

12. The vehicle of claim 9, wherein the travel direction-facing device is a travel direction-facing optical sensor.

13. The vehicle of claim 9, wherein the travel direction-facing device is a travel direction-facing light.

14. A vehicle comprising:
a housing for protecting a travel direction-facing device, the housing comprising a travel direction-facing perforated surface, the travel direction-facing perforated surface defining a cavity within the housing behind the travel direction-facing perforated surface;
the travel direction-facing device disposed within the cavity;
an air compressor that directs pressurized air through a tube; and
the tube that emits the pressurized air into the cavity;
wherein:
    the pressurized air emitted by the tube is propelled out of the cavity in a contrary direction to headwind air through holes in the travel direction-facing perforated surface; and
    the propelled air forms an air cushion in front of the travel direction-facing perforated surface that diverts headwind air away from the travel direction-facing perforated surface.

15. The vehicle of claim 14, wherein the air compressor comprises at least one fan that compresses air into the pressurized air.

16. The vehicle of claim 15, wherein the air compressor is powered by a battery of the vehicle.

17. The vehicle of claim 14, further comprising a barrier disposed within the cavity that protects the travel direction-facing device from the pressurized air.

18. The vehicle of claim 17, wherein the barrier and the travel direction-facing perforated surface are at least partially transparent.

19. The vehicle of claim 14, wherein the travel direction-facing device is a travel direction-facing optical sensor.

20. The vehicle of claim 14, wherein the travel direction-facing device is a travel direction-facing light.

* * * * *